June 29, 1965   I. C. HILL   3,191,690
MULTI-PURPOSE CORRUGATOR
Filed May 18, 1964   2 Sheets-Sheet 1
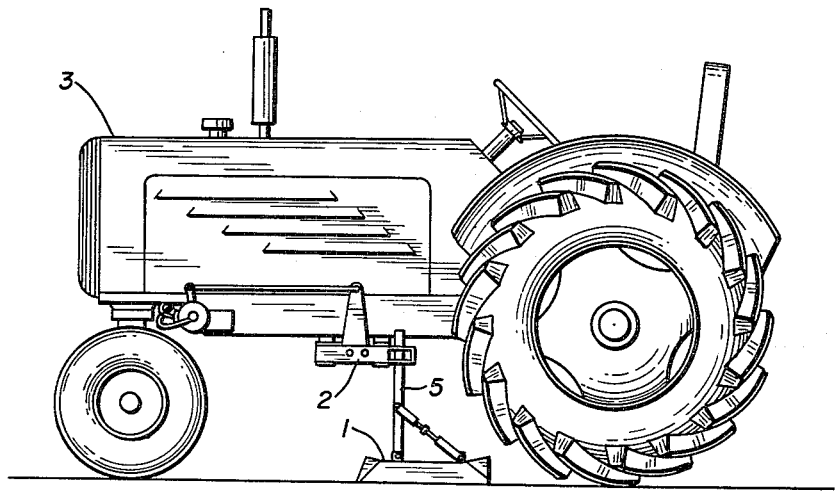
Fig_1
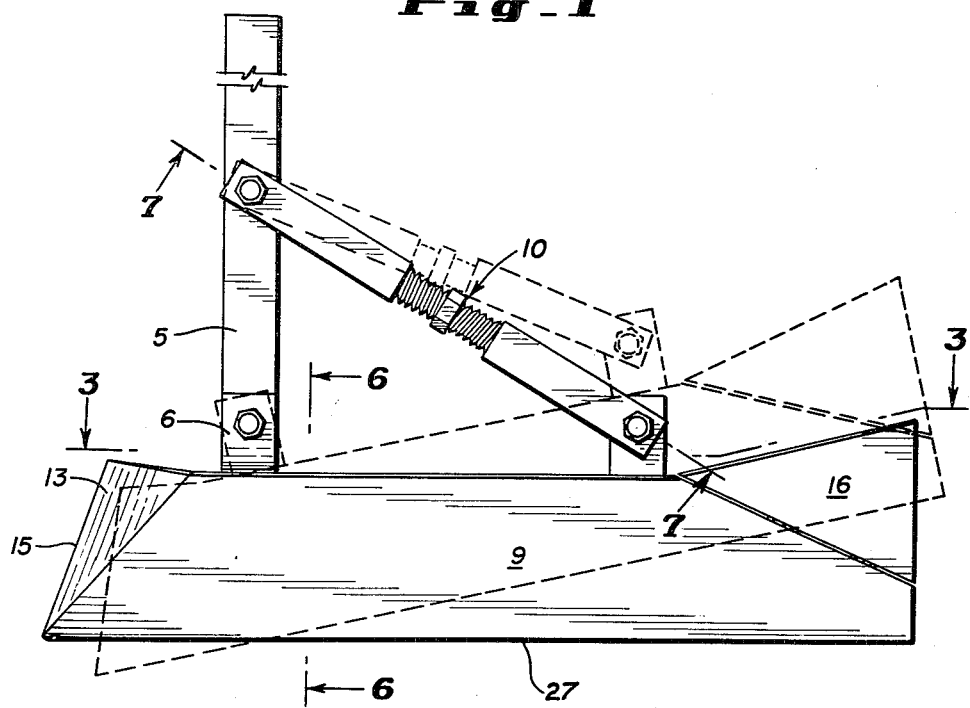
Fig_2
INVENTOR.
Isaac C. Hill
BY
ATTORNEY June 29, 1965     I. C. HILL     3,191,690
MULTI-PURPOSE CORRUGATOR
Filed May 18, 1964     2 Sheets-Sheet 2
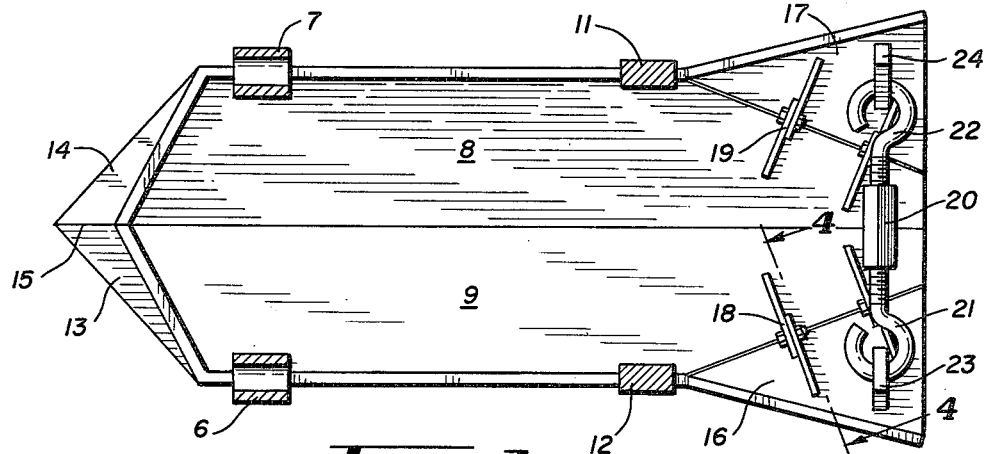
Fig. 3
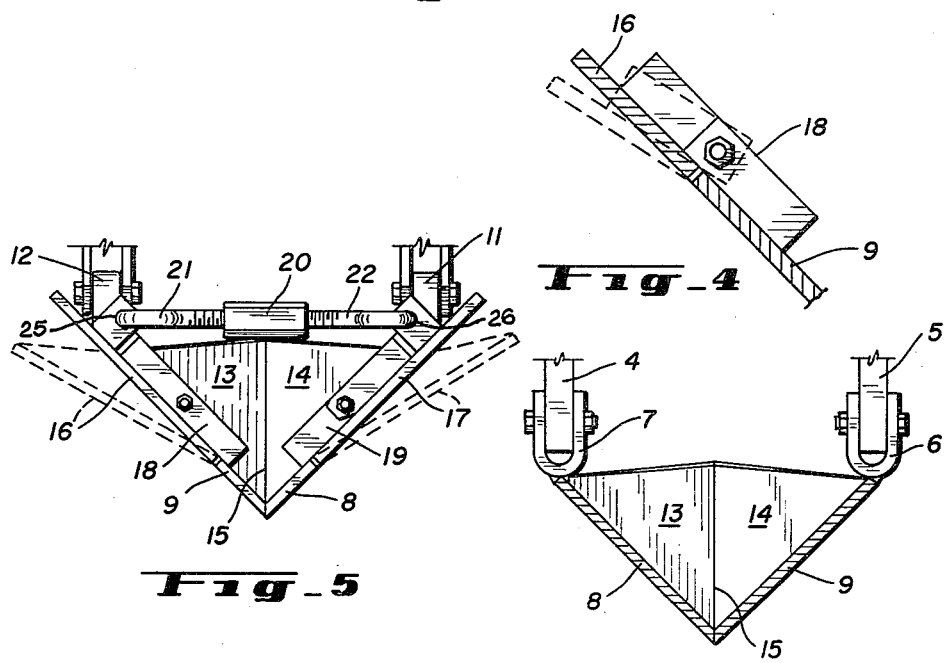
Fig. 4
Fig. 5
Fig. 6
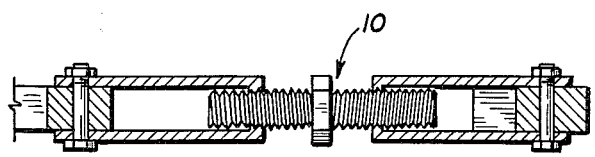
Fig. 7
INVENTOR.
Isaac C. Hill
BY
ATTORNEY

3,191,690
MULTI-PURPOSE CORRUGATOR
Isaac C. Hill, 809 E. Jackson, Riverton, Wyo.
Filed May 18, 1964, Ser. No. 368,094
3 Claims. (Cl. 172—722)

This invention relates to improvements in a corrugating device.

The object of the invention is to provide a corrugator which will produce a smooth and clean furrow, and, by the gentle action of angular wings attached to the corrugator, push the dirt from the furrow created over the crop row to destroy weeds without disturbing the crop.

Another object of the invention is to provide a corrugator which will pulverize clods of dirt in the furrow and pack the furrow more firmly, which is particularly beneficial in irrigation areas.

These and other objects of the invention will appear more fully from the following description and the accompanying drawings, in which:

FIGURE 1 is a side elevation view showing the corrugator unit attached to the cultivator of a farm tractor.

FIGURE 2 is a side elevation view of the corrugator with an alternate position shown in dotted lines.

FIGURE 3 is a top view of the corrugator taken along line 3—3 of FIGURE 2.

FIGURE 4 is a view of the hinge taken along line 4—4 of FIGURE 3.

FIGURE 5 is a rear view of the corrugator, with the wings shown in an alternate position by dotted lines.

FIGURE 6 is a front view of the corrugator taken along line 6—6 of FIGURE 2.

FIGURE 7 is a cross-sectional view of the corrugator adjusting mechanism taken along line 7—7 of FIGURE 2.

The corrugator 1 is assembled to a common tool bar 2 of a tractor 3, by means of the dual shanks 4 and 5. The shanks 4 and 5 are pivotally connected to the U-straps 6 and 7, which are integral with the angular sides 8 and 9 of the corrugator, as shown in FIGURE 6. Pivotally connected to each of the shanks 4 and 5 and to the apertured lugs 11 and 12 is an adjusting mechanism 10.

The forward portion of the corrugator has two plow plates 13 and 14, which are integral with the angular sides 8 and 9. These plow plates 13 and 14 join together to form a cutting edge 15 which slopes toward the back of the corrugator. The angular sides 8 and 9 form a V-shaped bottom 27 of the corrugator 1.

Pivotally connected to the rear of each of the angular sides 8 and 9 are triangular wings 16 and 17. The hinges 18 and 19 permit the triangular wings 16 and 17 to be adjusted in angular relation to the angular sides 8 and 9, by means of the turn-buckle 20, which receives the screw hooks 21 and 22 which are secured in the triangular wings 16 and 17 by means of anchors 23 and 24. The anchors 23 and 24 have apertures 25 and 26 to receive the screw hooks 21 and 22, respectively.

The cutting edge 15 can be raised and lowered by the adjusting mechanism 10, thus decreasing or increasing the plowing effect of the corrugator. By means of the turn-buckle 20, the triangular wings 16 and 17 can be adjusted to push more dirt from the furrow onto the crop row.

It is recognized that the invention is capable of changes and modifications without departing from the true spirit of the invention, and therefore, the following claims are intended to cover such recognized changes and modifications.

I claim as my invention:

1. A multi-purpose corrugator for connection to the transverse tool bar of a tractor which comprises a pair of shanks connected to the tool bar in spaced relation to each other in combination with a corrugator, said corrugator, including a pair of side plates connected with each other along one edge to form a unit of upwardly opening, V-shaped cross-section over a portion of its length, said corrugator including integrally formed plow plates connected with the forward ends of the side plates and with each other so as to define a vertically extending cutting edge, a pair of first pivot means each connected between one side plate and one of the shanks and having a common axis to permit angular adjustment of the corrugator about such axis, a wing hinged to each side plate adjacent the rearward end thereof, adjustment means extending between said wings to simultaneously adjust the position of each wing inwardly or outwardly of the plane of each side plate, a second pivot means connected to each side plate along the upper edge thereof and rearwardly of each said first pivot means, a third pivot means connected to each shank at a point between the first pivot means and the tool bar connection therefor, and adjustment means extending between the second and third pivot means associated with each side plate for angularly adjusting the corrugator about the axis of the first pivot means.

2. The invention according to claim 1 wherein each wing is connected to its corresponding side plate about a hinge axis which extends angularly upward toward the forward end of the corrugator.

3. The invention according to claim 2 wherein each wing is of triangular shape.

References Cited by the Examiner
UNITED STATES PATENTS

| 1,606,799 | 11/26 | Kassebeer | 172—722 X |
| 2,673,511 | 3/54 | Roberts | 172—722 |

FOREIGN PATENTS

| 34,800 | 8/11 | Sweden. |

ABRAHAM G. STONE, *Primary Examiner.*

T. GRAHAM CRAVER, *Examiner.*